United States Patent
Lamparsky et al.

[15] 3,670,026
[45] June 13, 1972

[54] UNSATURATED HYDROXY KETONES

[72] Inventors: Hans Dietmar Lamparsky, Dubendorf; Roman Marbet, Riehen, both of Switzerland

[73] Assignee: Givaudan Corporation, Delawanna, N.J.

[22] Filed: Sept. 26, 1968

[21] Appl. No.: 794,811

Related U.S. Application Data

[62] Division of Ser. No. 512,216, Dec. 7, 1965, Pat. No. 3,470,209.

[30] Foreign Application Priority Data

Dec. 11, 1964 Switzerland ..................15996/64

[52] U.S. Cl. ..............................260/592, 260/594
[51] Int. Cl. ..........................C07c 49/82, C07c 49/24
[58] Field of Search ............................260/594, 592

[56] References Cited

UNITED STATES PATENTS 2,088,015 7/1937 Wickert ..................260/594
3,252,998 5/1966 Ohloff et al. ..................260/594

*Primary Examiner*—Bernard Helfin
*Attorney*—Cifelli, Behr and Rhodes

[57] ABSTRACT

Processes and intemediates for novel ketones useful in perfumery on account of their desirable olfactory properties which ketones have the formula:

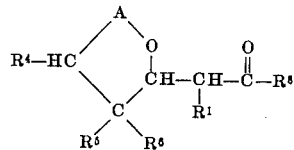

11 Claims, No Drawings

UNSATURATED HYDROXY KETONES

This application is a division of application Ser. No. 512,216 filed Dec. 7, 1965 and now U.S. Pat. No. 3,470,209.

The present invention relates to novel ketones and to a process for the manufacture thereof, which process is characterized in that a γ,δ-unsaturated aldehyde of the general formula

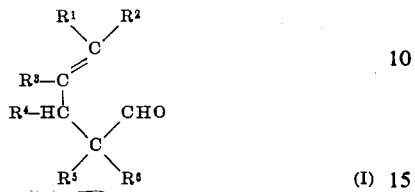

wherein $R^1$ represents a lower alkyl group which may be substituted by a free, esterified or etherified hydroxy group; a lower alkenyl, an aralkyl or aryl group, or together with $R^2$, a lower alkylene group; $R^2$ is a lower alkyl group, $R^5$, $R^4$ and $R^6$ represent hydrogen atoms or lower alkyl groups; and $R^6$ represents a hydrogen atom or a lower alkyl or alkenyl group, is reacted with a ketone of the general formula

wherein $R^7$ represents a hydrogen atom or a lower alkyl group which may be substituted by a free, esterified or etherified hydroxy group; and $R^8$ represents a lower alkyl group which may be substituted by a free, esterified or etherified hydroxy group; a lower alkenyl or an aryl group, in the presence of an alkaline condensation agent, whereupon the resulting hydroxy-ketone of the general formula

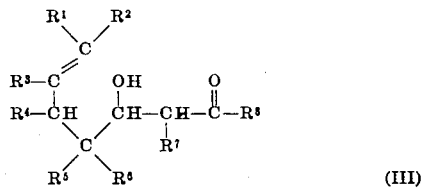

wherein $R^1$–$R^8$ have the above meaning, is cyclized in the presence of an acid cyclization agent.

Examples of lower alkyl groups represented by the symbols $R^1$–$R^8$ are alkyl groups having one to six carbon atoms such as methyl, ethyl, propyl, isopropyl, butyl, isobutyl, pentyl.

Examples of lower alkenyl groups represented by the symbols $R^1$, $R^5$ and $R^6$ are alkenyl groups having up to six carbon atoms such as allyl, 2-methyl-1-propenyl, 4-methyl-3-pentenyl, 2,3-dimethyl-2-butenyl.

Examples of lower alkylene groups represented by $R^1$ together with $R^2$ are tetramethylene and pentamethylene.

Examples of esterified and etherified hydroxy groups which can be present in $R^1$, $R^7$ and $R^8$ substituents are: acyloxy groups the acyl residue of which is derived from a lower aliphatic or aromatic carboxylic acid having one to seven carbon atoms such as formic acid, acetic acid, propionic acid, butyric acid, benzoic acid; lower alkoxy groups having one to seven carbon atoms such as methoxy, ethoxy, propoxy, isopropoxy, or aryloxy groups such as phenoxy. Examples of alkyl groups carrying free, esterified or etherified hydroxy groups are thus: hydroxy-methyl, acetoxy-ethyl, methoxy-propyl, 4-hydroxy-(or methoxy or acetoxy)-4-methyl-pentyl.

The phenyl group may be named as an example of an aryl group which may be present as the $R^1$- or $R^8$-group, and the benzyl of phenethyl group as an aralkyl group ($R^1$).

As the alkaline condensation agent for the reaction of the aldehyde of formula I with the ketone of formula II there can be used, for example, alkali alcoholates such as sodium methylate and sodium ethylate. These alcoholates can be added to the reaction mixture in solid form, e.g., as powder, or in the form of solutions. Thus, for example, a solution of sodium ethylate in ethanol can be used. As condensation agents there can be further mentioned: alkali metal or alkaline earth metal hydroxides and carbonates such as, for example, sodium, potassium or barium hydroxide, conveniently in absolute alcoholic solution such as a solution in absolute methanol, ethanol or isopropanol.

The condensation reaction can be carried out with or without the addition of a solvent. When using, for example, acetone, methyl-ethyl-ketone or mesityl oxide as the ketone component, the addition of a special solvent is superfluous. Otherwise hydrocarbons such as benzene or toluene can be used as solvents.

The temperature of the condensation reaction can vary within wide limits. When using, for example, acetone as the ketone component, the preferred temperature range is −15° to +15° C. The condensation reaction can, however, also be carried out at reflux temperature; for example, if methyl ethyl ketone is employed as the ketone component.

For the cyclization of the hydroxy-ketones [ketols] of general formula III, which are obtained by the condensation reaction, the following acid cyclization agents, for example, are suitable: mineral acids such as sulphuric acid, hydrohalic acids, for example, hydrochloric acid or hydrobromic acid; phosphoric acid; strong cyclization acids such as paratoluenesulphonic acid. As solvents for the cyclization reaction, hydrocarbons, such as benzene, toluene, high-boiling petroleum ether, are, for example, suitable. The cyclization is preferably carried out at elevated temperatures; for example, at temperature above 50° C, conveniently at the reflux temperature of the reaction mixture, particularly in the range of about 70°–110° C.

The products of cyclization have the general formula

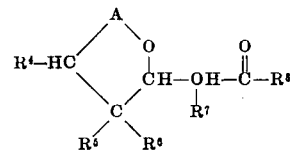

wherein A is a member selected from the group consisting of

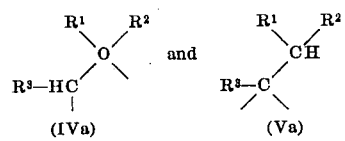

Depending on the nature of the starting materials used, various diastereomeric tetrahydropyran compounds of the formula

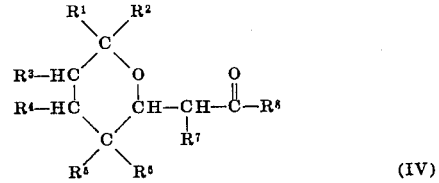

or the isomeric tetrahydrofuran compounds of the formula

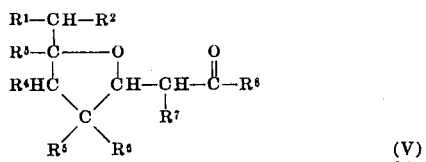

or mixtures of compounds of formulae IV and V result from the ring closure.

In those cases where $R^3$ in the compounds of formulae I and III represents hydrogen, the end products are predominantly tetrahydropyrans of formula IV. If, however $R^3$ in the compounds of formulae I and III represents a lower alkyl group, tetrahydrofurans of formula V are obtained predominantly, the resulting reaction mixture containing also tetrahydropyrans of formula IV. The mixtures of diastereomers as well as the mixture of tetrahydrofurans and tetrahydropyrans may be resolved by the usual methods such as, for example, fractional distillation or chromatography.

The aldehydes of general formula I which are used as starting materials in the present process can be obtained by reacting a secondary or tertiary allyl alcohol of the general formula

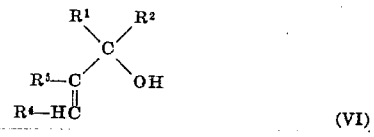

wherein $R^1$–$R^4$ have the above significance, with an enol ether of the general formula

or an acetal of the general formula

in which formulae the symbols $R^5$ and $R^6$ have the above significance and R represents a lower alkyl group,
in the presence of an acid catalyst (such as a mineral acid, for example, sulphuric acid; but especially phosphoric acid; or a strong organic acid such as oxalic acid, trichloro-acetic acid, paratoluene-sulphonic acid) and if desired with the application of elevated pressure.

The tetrahydropyran compounds of formula IV and the isomeric tetrahydrofuran compounds of formula V which are obtainable according to the process of the present invention are characterized by particular odor-notes. As a rule, rose-like, iris-like and wood-notes are prevalent. The products of formulae IV and V as well as mixture thereof can thus be used as odorants for the manufacture of perfumed products.

EXAMPLE 1

56.0 g of 5-methyl-4-hexen-1-al and 290 g of acetone are mixed and the resulting mixture is treated dropwise with stirring at 15° to 20° C with a sodium ethylate solution freshly prepared from 0.6 g of sodium and 10 ml of absolute ethanol. After complete addition, the reaction mixture is stirred for a further 2 hours at 15° C, then neutralized with glacial acetic acid, whereupon the excess of acetone is distilled off on the water-bath. The residue is taken up in 200 ml of ether, the ethereal solution is washed with water and dried. The residue (90 g), which remains after evaporation of the solvent, is distilled in vacuum, the fractions which pass over at 87°–90° C being collected. Yield: 34.2 g of 4-hydroxy-8-methyl-7-nonen-2-one, boiling point 56°–58° C/0.01 mm; $n_D^{20}$ = 1.4670; bands of the IR-spectrum; 3,448, 1,718, 1,165, 1,092 cm$^{-1}$.

57.0 g of distilled 4-hydroxy-8-methyl-7-nonen-2-one are boiled at reflux with stirring for 4 hours with 5.7 g of concentrated phosphoric acid in 150 ml of benzene. After cooling, the reaction solution is poured on ice, the organic phase is decanted, the aqueous phase is extracted with toluene, the combined organic solution is washed neutral with water, dried and freed from solvent in vacuum, The residue (53 g) is subjected to fractional distillation. There are obtained 37 g of 2-acetonyl-6,6-dimethyl-tetrahydropyran, purification of which yields a uniform product of boiling point 43°–44° C/1 mm; $n_D^{20}$ = 1.4455. The IR-spectrum shows strong bands at 1,715, 1,374, 1,357, 1,096 and 1,072 cm$^{-1}$. (Fruit-like fragrance with camphor-like note).

EXAMPLE 2

126 g of 2,5-dimethyl-4-hexen-1-al are dissolved in 580 g of acetone. A total of 2.7 g of sodium methylate is added in small portions with stirring at 10° to 15° C to this solution. Stirring is continued for 2 ½ hours at 15°–18° C. The solution is subsequently neutralized with glacial acetic acid and worked up as in Example 1. Yield: 102.5 g of 4-hydroxy-5,8-dimethyl-7-nonen-2-one of boiling point 70°–72° C/0.03 mm; $n_D^{20}$ = 1.4685.

132 g of this ketol are boiled at reflux for 4 hours with 13.2 g of crystallized phosphoric acid in 400 ml of benzene. After working up as in Example 1 there are obtained 87 g of 2-acetonyl-3,6,6-trimethyl-tetrahydropyran in the form of an isomer mixture. Careful fractionation on the spinning-band column results in concentration (up to 94% purity) of the diastereomer of boiling point 53°–54° C/1 mm which had been formed as the main product; $n_D^{20}$ = 1.4457. The IR-spectra of this and the second-most important isomer show the characteristic absorption bands at 1,718, 1,089 and 1,056 cm$^{-1}$. The product has a green note which is reminiscent of roses.

EXAMPLE 3

70 g of 2,4,5-trimethyl-4-hexen-1-al in 290 g of acetone are treated in the course of 20 minutes, with stirring at 14° to 18° C, with 1.35 g of sodium methylate and subsequently stirred for a further 2 hours at the same temperature. Working up as in Example 1 yields 55.7 g of 4-hydroxy-5,7,8-trimethyl-7-nonen-2-one of boiling point 71°–72° C/0.06 mm; $n_D^{20}$ = 1.4769–1.4779.

59.4 g of distilled 4-hydroxy-5,7,8-trimethyl-7-nonen-2-one are heated at reflux for 4 hours with 5.9 g of 85% phosphoric acid and 150 ml of benzene. The working up is effected as in the foregoing Examples. There is obtained an isometric mixture (39.5 g), fractionation of which yields the isomer of boiling point 61°–62° C/1 mm, $n_D^{20}$ = 1.4448, as the main product.

The NMR spectrum (signal at 1,08 ppm) and the mass spectrum (m/e = 155 and m/e = 43) indicate that this product is 2-acetonyl-3,5-dimethyl-5-isopropyl-tetrahydrofuran. This compound has a pleasant spicy odor reminiscent of bay and eucalyptus.

Besides the above tetrahydrofuran compound, a substance of melting point 83°–85° C/3 mm can be isolated from the reaction mixture by usual separation methods (distillation or chromatography), the NMR spectrum (signal at 1,16 ppm) and the mass spectrum (no signal at m/e = 155) of which substance indicate that said substance is 2-acetonyl-3,5,6,6-tetramethyl-tetrahydropyran.

EXAMPLE 4

70 g of 2,2,5-trimethyl-4-hexen-1-al are dissolved in 290 g of acetone and the solution is cooled to 0° C. 1.35 g of sodium methylate are then introduced portionwise into this solution in the course of 20 minutes with cooling with an ice/salt mixture and stirring. The mixture is subsequently stirred for a further 4 hours at temperatures between 0° and –4° C and then worked up. There are obtained around 96 g of a product rich in 4-hydroxy-5,5,8-trimethyl-7-nonen-2-one (absorption bands of the IR-spectrum at 3,378, 1,712 and 1,160 cm$^{-1}$) which product is cyclized, without distillative purification, to 2-acetonyl-3,3,6,6-tetramethyl-tetrahydropyran with 9.7 g of 95% phosphoric acid in 300 ml of benzene by boiling at reflux for 4 hours. Working up as in the foregoing Examples gives, after a single distillation, around 21 g of a product from which there is obtained after rectification 2-acetonyl-3,3,6,6-tetramethyl-tetrahydropyran as a crystalline substance of melting point 43°–44° C (boiling point 78°–80° C/1.5 mm). The odor of this compound is flowery-fresh.

EXAMPLE 5

4-Hydroxy-8-methyl-5-pentyl-7-nonen-2-one is obtained from 54.6 g of 2-pentyl-5-methyl-4-hexen-1-al and 174 g of acetone, by addition of 0.85 g of sodium methylate at temperatures between −6° and −12° C, stirring for 3 hours and the usual working up (in which the excess acetone is sucked off in the vacuum of the water-jet pump); yield of crude 4-hydroxy-8-methyl-5-pentyl-7-nonen-2-one: 67 g.

After the addition of 6.7 g of concentrated phosphoric acid and 225 ml of benzene, this ketol is cyclized to 2-acetonyl-3-pentyl-6,6-dimethyl-tetrahydropyran (crude yield 24 g). Rectification in the spinning-band column yields a mixture of the two possible diastereomers of boiling point 117°–118° C/1.5 mm; $n_D^{20}$ = 1.4556–1.4558. The product has an earthy, mushroomlike odor.

EXAMPLE 6

63 g of 2,5-dimethyl-4-hexen-1-al are heated to 70° C together with 180 g of methyl-ethyl-ketone. Condensation is effected by the addition of 1.35 g of sodium methylate and heating at reflux for 3 hours. The reaction mixture is cooled, neutralized with glacial acetic acid, excess methyl ethyl ketone is distilled off in water-jet vacuum, the residue is taken up in ether and is washed free of salt with water. After drying the ethereal solution and evaporation of the solvent there remain 84 g of a crude mixture of 5-hydroxy-6,9-dimethyl-8-decen-3-one and 4-hydroxy-3,5,8-trimethyl-7-nonen-2-one (boiling point 71°–75° C/0.025 mm; $n_D^{20}$ = 1.4654–1.4657).

This ketol mixture is boiled at reflux for 4 hours with 8.4 g of phosphoric acid and 280 ml of benzene and the product of cyclization so formed is worked up as in Example 1. After a single distillation there are obtained 29 g of a product, rectification of which leads to an isomer mixture of boiling point 76°–78 C/3 mm; $n_D^{20}$ = 1.4488, said mixture consisting of 2-(2′-Oxobutyl)-3,6,6-trimethyl-tetrahydropyran and 2-(2′-Oxo-1′-methyl-propyl)-3,6,6-trimethyl-tetrahydropyran. The product has a pleasing flowery odor reminiscent of lily of the valley.

EXAMPLE 7

70 g of 2,4,5-trimethyl-4-hexen-1-al and 185 g of methyl-ethyl-ketone are mixed and treated at 15° in the course of 20 minutes with a solution of 1 g of sodium hydroxide in 10 g of methanol. The condensation is completed by stirring at room temperature for 3 hours. Working up as described in Example 6 yields 88.6 g of a crude mixture of 5-hydroxy-6,8,9-trimethyl-8-decen-3-one and 4-hydroxy-3,5,7,8-tetramethyl-7-nonen-2-one, which mixture is cyclized to a mixture of tetrahydrofurans and tetrahydropyrans, which has a woody and tobacco-like odor. The NMR and mass spectrogramm data indicate that this mixture contains the following substance:

2-(2′-Oxobutyl)-3,5-dimethyl-5-isopropyl-tetrahydrofuran (NMR signal at 1,05 ppm; mass spectrum: m/e = 169; 57);

2-(2′-Oxo-1′-methyl-propyl)-3,5-dimethyl-5-isopropyl-tetrahydrofuran (NMR signal at 1,05 ppm; mass spectrum: m/e = 169; 43);

2-(2′-Oxobutyl)-3,5,6,6-tetramethyl-tetrahydropyran (NMR signal at 1,17 ppm; mass spectrum: m/e = 128; 57);

2-(2′-Oxo-1′-methyl-propyl)-3,5,6,6-tetramethyl-tetrahydropyran.

EXAMPLE 8

56 g of 5-methyl-4-hexen-1-al and 120 g of acetophenone are dissolved in 200 ml of dry toluene. A solution of 1.0 g of sodium hydroxide in 10 g of methanol is added dropwise with stirring in the course of 30 minutes to the toluene solution which is previously cooled to 0° to −5° C, and the mixture is subsequently stirred for a further 3 hours in the same temperature range. After neutralization with glacial acetic acid, the toluene is distilled off under reduced pressure and the excess acetophenone is distilled off at about 2 torr. The residue is taken up in ether and washed free of salt with water. After drying the ethereal solution and evaporation of the solvent, there are obtained 63 g of crude 3-hydroxy-1-phenyl-7-methyl-6-octen-1-one.

The cyclization of 91.5 g of this crude ketol is effected by means of 9.2 g of phosphoric acid in 310 ml of boiling toluene. After fractionation in a spinning-band column there is obtained 2-phenacyl-6,6-dimethyl-tetrahydropyran of boiling point 140°–142° C/1.8 mm; $n_D^{20}$ = 1.5196. This compound has a carnation-like odor.

EXAMPLE 9

A mixture of 33.6 g of 5-methyl-4-hexen-1-al and 147 g of mesityl oxide is cooled to 0° C. Condensation is initiated by the dropwise addition of a solution of 0.75 g of sodium hydroxide in 7.5 g of methanol and completed by stirring at 15° C for 3 hours. The usual working up yields about 49 g of crude 6-hydroxy-2,10-dimethyl-2,9-undecadien-4-one which in the IR-absorption spectrum shows the strong bands for secondary hydroxyl (3,401 and 111 cm⁻¹), conjugated carbonyl (1,681 and 1,618 cm⁻¹) and a trisubstituted double bond (797 cm⁻¹). This ketol is distillable with partial dehydration; boiling point 100°–105° C/0.1 mm; $n_D^{20}$ = 1.4876–1.4880.

Upon boiling at reflux for 4 hours in 150 ml of benzene in the presence of 5 g of 85% phosphoric acid, the crude ketol yields 12.5 g of 2-(2′-oxo-4′-methyl-3′-pentenyl)-6,6-dimethyl-tetrahydropyran of boiling point 68° C/0.2 mm; $n_D^{20}$ = 1.4710–1.4720, (Woody fragrance).

EXAMPLE 10

In a manner analogous to the foregoing examples, there are obtained the following tetrahydropyrans:

2-Acetonyl-6-methyl-6-isobutyl-tetrahydropyran; boiling point 81° C/1 mm; $D_4^{20}$ = 0.9275; $n_D^{20}$ = 1.4549; IR absorption bands at 1,724, 1,075, 1,047 and 1,020 cm⁻¹. (Woody to fruit-like fragrance, reminiscent of bergamot).

2-Acetonyl-3,6-dimethyl-6-isobutyl-tetrahydropyran; boiling point 75° C/0.7 mm; $n_D^{20}$ = 1.4583; IR-absorption bands at 1,718, 1,094, 1,073, 1,058 and 1,005 cm⁻¹. (Green, fruity fragrance).

2-Acetonyl-1-oxa-spiro[5.5]undecane; boiling point 98° C/1.5 mm; $D_4^{20}$ = 0.9978; $n_D^{20}$ = 1.4800; IR absorption bands at 1,718, 1,070, 1,033 and 1,005 cm⁻¹. (Earthy fragrance.)

2-Acetonyl-3-methyl-1-oxa-spiro[5.5]undecane; boiling point 101°/1.5 mm; $n_D^{20}$ = 1.4848; IR absorption bands at 1,718, 1,099, 1,085, 1,064 and 1,010 cm⁻¹. (Green, fruity fragrance note.)

2-Acetonyl-3-isopropyl-6,6-dimethyl-tetrahydropyran; boiling point 94° C/1.5 mm; $n_D^{20}$ = 1.4547; IR absorption bands at 1,712, 1,087, 1,050, 1,035 and 1,002 cm⁻¹. (Green spicy fragrance note.)

2-Acetonyl-3-ethyl-6,6-dimethyl-tetrahydropyran; boiling point 83° C/1.5 mm; $n_D^{20}$ = 1.4530; IR absorption bands at 1,718, 1,087, 1,070 and 1,000 cm⁻¹. (Fresh, mint-like fragrance; woody base note.)

Also, in a manner analogous to that of the foregoing examples, there are obtained the following tetrahydrofurans in admixture with the isomeric tetrahydropyrans:

2-Acetonyl-3-ethyl-5-methyl-5-isopropyl-tetrahydrofuran and 2-acetonyl-3-ethyl-5,6,6-trimethyl-tetrahydropyran; boiling point 92°–93° C/2 mm; $n_D^{20}$ = 1.4492–1.4650; IR absorption bands at 1,718 1,094, 1,064 and 1,008 cm⁻¹. (Green, fatty fragrance note.)

2-Acetonyl-3,3,5-trimethyl-5-isopropyl-tetrahydrofuran and 2-acetonyl-3,3,5,6,6-pentamethyl-tetrahydropyran; boiling point 91° C/1.5 mm; $n_D^{20}$ = 1.4483–1.4546; IR absorption spectrum 1,718, 1,099 and 1,066 cm⁻¹. (Cedarwood-like fragrance.)

2-Acetonyl-5-methyl-5-isopropyl-tetrahydrofuran and 2-acetonyl-5,6,6-trimethyl-tetrahydropyran; boiling point 54° C/1 mm; $D_4^{20}$ = 0.9357; $n_D^{20}$ = 1.4470–1.4538; IR absorption bands at 1,718, 1,087, 1,062 and 1,010 cm⁻¹. (Green fragrance note.)

2-Acetonyl-3-pentyl-5-methyl-5-isopropyl-tetrahydrofuran and 2-acetonyl-3-pentyl-5,6,6-trimethyl-tetrahydropyran; boiling point 131° C/1.5 mm; $n_D^{20}$ = 1.4591–1.4628; IR absorption bands at 1,712 and 1,087 cm$^{-1}$. (Fruity, flowery fragrance.)

2-Acetonyl-5-methyl-3,5-diisopropyl-tetrahydrofuran and 2-acetonyl-3-isopropyl-5,6,6-trimethyl-tetrahydropyran, boiling point 73°–75° C/0.03 mm, $n^{20}{}_D = 1,4560–1,4615$, IR-absorption bands at 1,712, 1,085 and 1,070 cm$^{-1}$. (Spicy, nut-like fragrance.)

2-Acetonyl-3,5-dimethyl-3-ethyl-5-isopropyl-tetrahydrofuran and 2-acetonyl-3,5,6,6-tetramethyl-3-ethyl-tetrahydropyran, boiling point 108–110° C/3 mm, $n^{20}{}_D = 1,4608–1,4622$, IR-absorption bands at 1,712, 1,087 and 1,070 cm$^{-1}$. (Fruit-like fragrance.)

The presence of the tetrahydrofurans and tetrahydropyrans in the above mixtures is, inter alia, indicated by the respective NMR and mass spectrum data.

Whenever the context of the specification and claims so requires or admits, it is intended to include diastereoisomers and mixtures of any compound falling under the general formulae IV and V.

We claim:
1. Hydroxy-ketones of the general formula

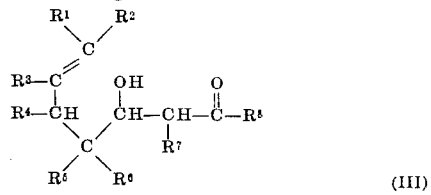

(III)

wherein $R^1$ and $R^2$ represent lower alkyl groups; $R^3$, $R^4$ and $R^5$ represent hydrogen atoms or lower alkyl groups, $R^6$ represents a hydrogen atom or a lower alkyl, $R^7$ is a hydrogen atom or a lower alkyl group, and $R^8$ represents a lower alkyl group, a lower alkenyl or phenyl group.

2. A compound as claimed in claim 1, wherein $R^1$, $R^2$ and $R^8$ are methyl groups and $R^3$, $R^4$, $R^5$, $R^6$ and $R^7$ are hydrogen atoms.

3. A compound as claimed in claim 1, wherein $R^1$, $R^2$, $R^5$ and $R^8$ are methyl groups and $R^3$, $R^4$, $R^6$ and $R^7$ are hydrogen atoms.

4. A compound as claimed in claim 1, wherein $R^1$, $R^2$, $R^3$, $R^5$ and $R^8$ are methyl groups and $R^4$, $R^6$ and $R^7$ are hydrogen atoms.

5. A compound as claimed in claim 1, wherein $R^1$, $R^2$, $R^5$, $R^6$ and $R^8$ are methyl groups and $R^3$, $R^4$ and $R^7$ are hydrogen atoms.

6. A compound as claimed in claim 1, wherein $R^1$, $R^2$ and $R^8$ are methyl groups, $R^5$ is a pentyl group and $R^3$, $R^4$, $R^6$ and $R^7$ are hydrogen atoms.

7. A compound as claimed in claim 1, wherein $R^1$, $R^2$ and $R^5$ are methyl groups, $R^3$, $R^4$, $R^6$ and $R^7$ are hydrogen atoms and $R^8$ is an ethyl group.

8. A compound as claimed in claim 1, wherein $R^1$, $R^2$, $R^5$, $R^7$ and $R^8$ are methyl groups and $R^3$, $R^4$ and $R^6$ are hydrogen atoms.

9. A compound as claimed in claim 1, wherein $R^1$, $R^2$, $R^3$, $R^5$, $R^7$ and $R^8$ are methyl groups and $R^4$ and $R^6$ are hydrogen atoms.

10. A compound as claimed in claim 1, wherein $R^1$ and $R^2$ are methyl groups, $R^3$, $R^4$, $R^5$, $R^6$ and $R^7$ are hydrogen atoms and $R^8$ is a phenyl group.

11. A compound as claimed in claim 1, wherein $R^1$ and $R^2$ are methyl groups, $R^3$, $R^4$, $R^5$, $R^6$ and $R^7$ are hydrogen atoms and $R^8$ is a 2-methyl-1-propenyl group.

* * * * *

UNITED STATES PATENT OFFICE
CERTIFICATE OF CORRECTION

Patent No. 3,670,026                    Dated June 13, 1972

Inventor(s)  Hans Lamparsky et al.

It is certified that error appears in the above-identified patent and that said Letters Patent are hereby corrected as shown below:

Column 2, formula opposite line 45, formula IVa is corrected as shown below:

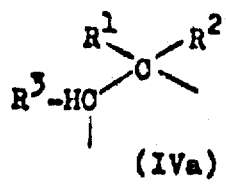

Column 2, between lines 65 and 70, formula V is corrected to read as shown below:

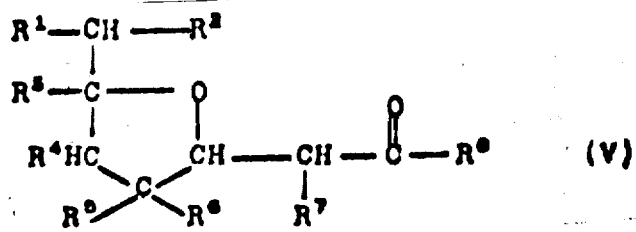

Signed and sealed this 11th day of March 1975.

(SEAL)
Attest:

RUTH C. MASON
Attesting Officer

C. MARSHALL DANN
Commissioner of Patents
and Trademarks